July 3, 1956 V. W. YAHN ET AL 2,753,477
ELECTRICAL BRUSH ASSEMBLY
Filed Aug. 31, 1953 2 Sheets-Sheet 1
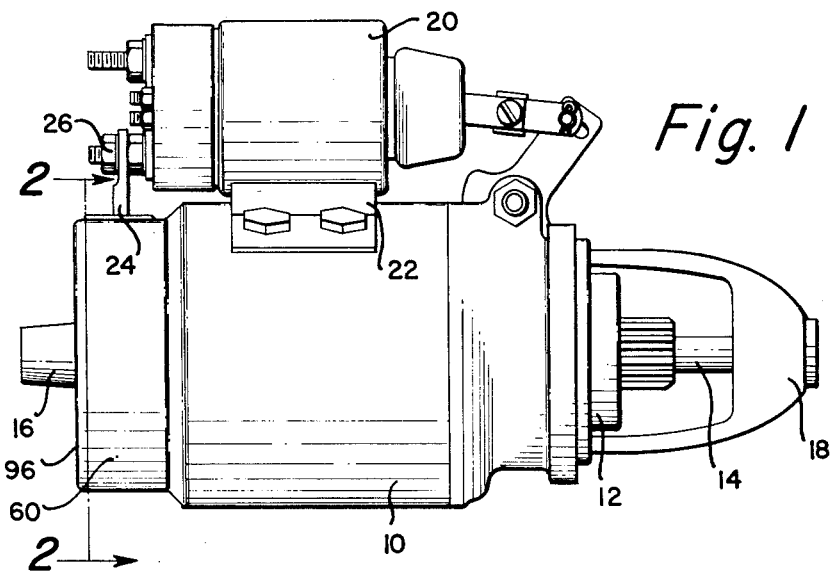
Fig. 1
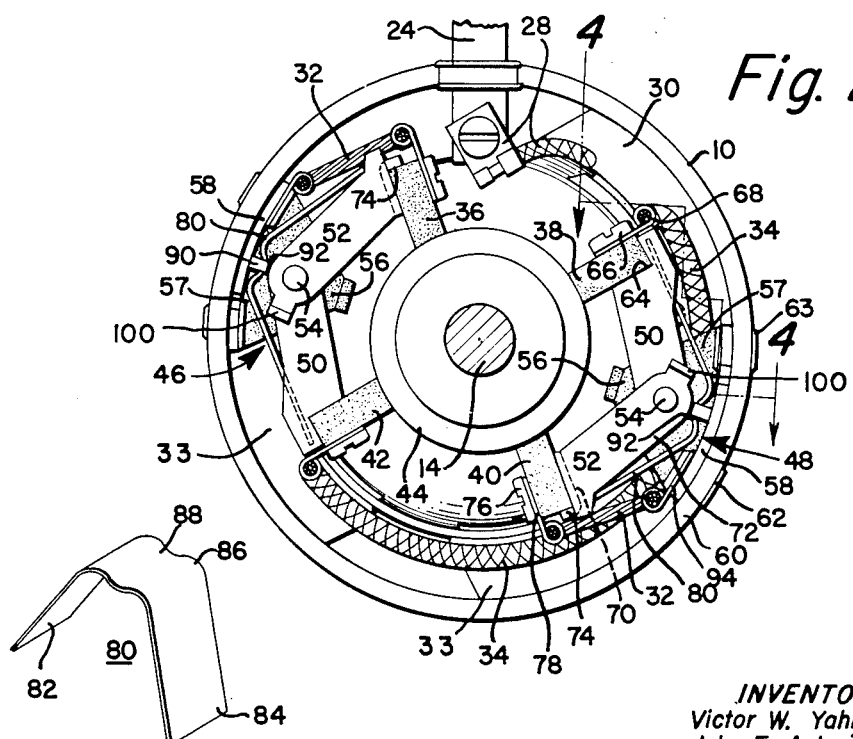
Fig. 2
Fig. 5
INVENTORS
Victor W. Yahn
John E. Antonidis,
William C. Edmundson &
Derother H. Dudderar
BY
Their Attorney July 3, 1956  V. W. YAHN ET AL  2,753,477
ELECTRICAL BRUSH ASSEMBLY
Filed Aug. 31, 1953  2 Sheets-Sheet 2

INVENTORS
Victor W. Yahn
John E. Antonidis,
William C. Edmundson &
BY Derother H. Dudderar Their Attorney United States Patent Office 2,753,477
Patented July 3, 1956

2,753,477

ELECTRICAL BRUSH ASSEMBLY

Victor W. Yahn, John E. Antonidis, William C. Edmundson, and Derother H. Dudderar, Anderson, Ind., assignors to General Motors Corporation, Detroit, Mich., a corporation of Delaware Application August 31, 1953, Serial No. 377,434

12 Claims. (Cl. 310—239)

This invention relates to electrical apparatus such as dynamoelectric machines and parts thereof.

A particular object of the invention is to provide a brush rigging or like structure suitable for preassembly and quickly mountable in a frame structure of a dynamoelectric machine for cooperation with a rotatable commutator.

In the conventional dynamoelectric machine, of the type where a cylindrical commutator rotates within a group of brushes, it has been the practice to mount the brush carrying structure on an end plate supporting the armature and fixed to the motor frame. It is difficult to properly align and assemble such a structure, since the brushes must be spread enough to permit passage over the commutator, and it is almost impossible to make the lead connections and properly dispose them when there is no opening in the field frame. Also it is thereafter impossible to inspect and adjust the brush and commutator condition and relation without providing openings in the frame structure.

This invention eliminates these past difficulties by providing a sheet metal bracket having one portion suitable for mounting on a curved surface and an adjoining portion suitable for supporting a pivot pin on which are mounted a pair of brush carrying arms that are urged by means of a single leaf spring into cooperable engagement with a commutator, the bracket having means for seating and securing the leaf spring against displacement with respect to the brushes of the assembly. There is then an assembly of brushes, arms, and supporting bracket with spring means for the brushes that may be mounted on the concave side of a cylindrical frame portion. It is also a simple matter to make connections between the windings, terminals and the brushes, and to assemble with respect to the commutator before the end plate is fixed in place.

Further objects and advantages of the present invention will be apparent from the following description reference being had to the accompanying drawings wherein a preferred embodiment of the present invention is clearly shown.

In the drawings:

Fig. 1 is an elevational view of a starting motor and control switch, in which the instant invention is applied;

Fig. 2 is a partial section and an end elevation of the interior of the motor showing an installation of the brush structure, taken on line 2—2 of Fig. 1;

Fig. 5 is a perspective view of the leaf spring used in the improved brush structure.

Figure 3:
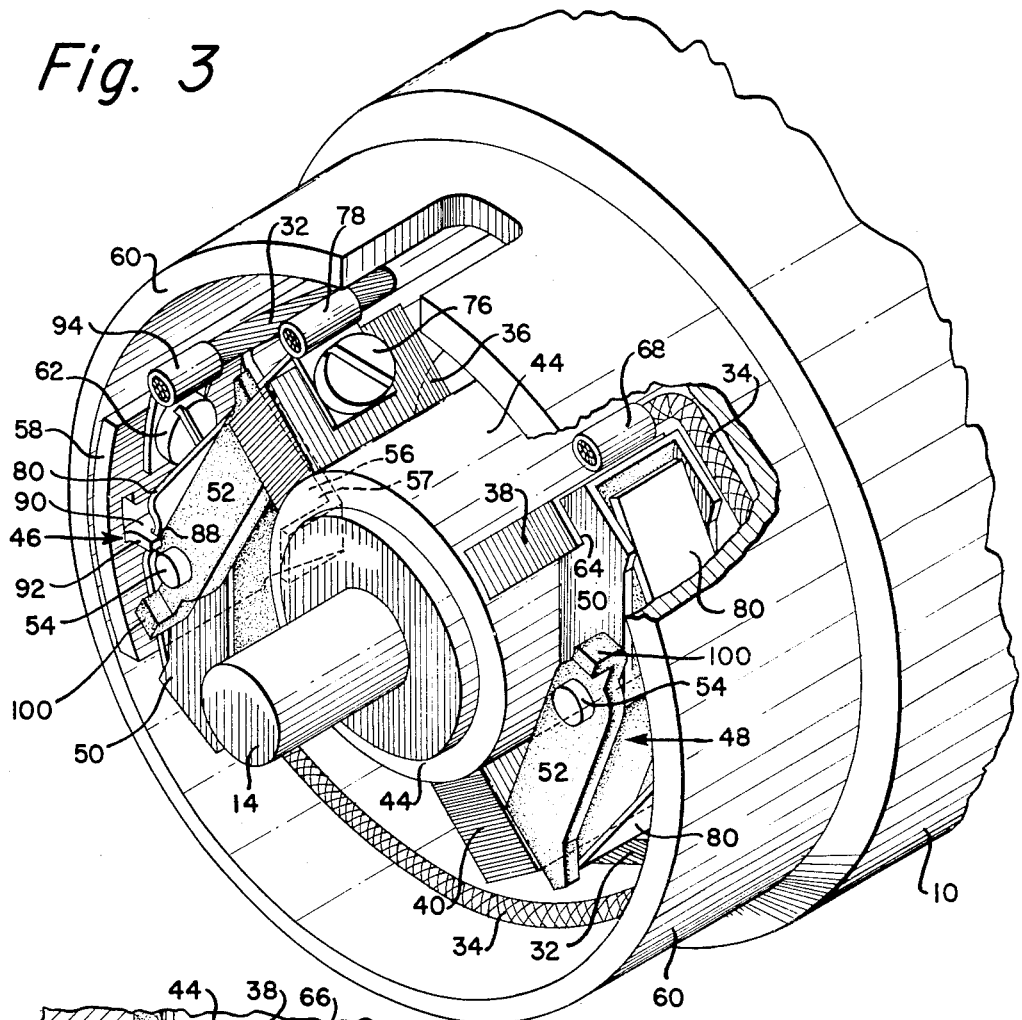
Fig. 3 is an enlarged view in perspective illustrating the brush assembly used in a starting motor structure.
Figure 4:
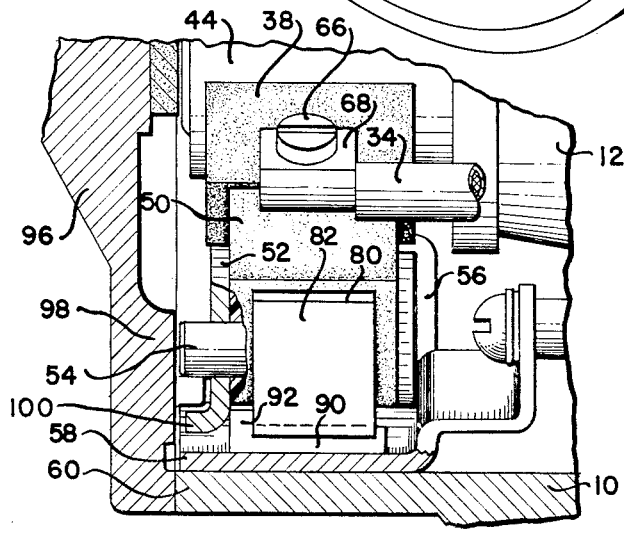
Fig. 4 is an enlarged view of one of the brush assemblies substantially as indicated by the stepped-view-line and arrows 4—4 of Fig. 2.

With particular reference to the drawing, 10 indicates a field frame and casing of an electric starting motor for automobile engines. The casing 10 encloses windings for energizing an armature 12 carried by a shaft 14 rotatable on bearings 16 and 18. The operation of the device is under control of a solenoid 20 mounted on the frame 10 by a bracket 22 and having electrical connection to the interior of the frame 10 by means of a connector 24 joined to a terminal 26. An electric lead and clip 28 inside of the frame 10, Fig. 2, makes electrical connection with the shunt field winding 30 while other leads 32 and 34 make proper electrical connection of the series field 33, with brushes 36, 38, 40 and 42 each of which ride on a commutator 44 carried by the armature 12 and shaft 14 in the conventional manner.

As shown in Fig. 2, the brushes 36 to 42 are grouped in two pairs of similar brush assemblies herein designated at 46 and 48. The detailed description of one brush assembly should therefore be sufficient to include the specific details of the other. With reference to the brush assembly 48, the brushes 38 and 40 are secured to brush carrying arms 50 and 52 respectively, each arm being pivotally supported on pivot pin 54 standing out from a flat portion 56 of a bracket 57 integrally joined to a base portion 58. The base portion 58 is curved so as to be mountable on the concave side of a cylindrical portion 60 extending from the frame 10 where the bracket is secured by means of rivets 62 and 63.

The brush carrying arm 50 is of nonconducting material and has a free end notched at 64 to receive one end of the brush 38 which is held in place by a mounting screw 66 passing through a terminal clip 68 and threaded into the end of the arm 50. The brush 38 is electrically connected through the clip 68 and wire 34 with the brush 42 of the other assembly 46. The brush carrying arm 52 is formed from sheet metal and has an inclined end portion 70, from opposite ends of which extend arms 72 spaced to embrace the nonconducting arm 50, and apertured to receive the pivot pin 54. Bent outwardly from the inclined end portion 70 there is a lug or flange 74 in position to abut one end of brush 40 secured by a screw 76 extended through a terminal clip 78 and threaded into the inclined end portion 70.

When the brush carrying arms 50 and 52 are assembled on the pivot pin 54 the brushes 38 and 40 are made to engage the commutator 44 by means of a U-shaped leaf spring 80 of the type shown in Fig. 5. The spring 80 is of the bowed leaf spring type in which there are similar arms 82 and 84 that are joined by bight 86 having a reentrant curve 88 transverse thereof, providing a seating portion for engagement with a rib 90 extending from the concave surface at the mounting base 58 of the bracket. An integrally formed lug 92 on the end of the rib 90 prevents disengagement of the spring and brush carriers.

The arrangement provides two similar brush assemblies 46 and 48. The assembly 46 consisting of two brushes 36 and 42 while the assembly 48 includes the brushes 38 and 40. The brushes 36 and 40 are mounted respectively on the metal arms while the brushes 38 and 42 are mounted respectively on nonconducting arms 50. The arms 50 and 52 respectively are pivotally supported on pins 54 and urged by spring 80 so as to move the brushes into engagement with the commutator. The grounded brushes are electrically connected from terminal 78 by wire 32 to ground clip 94 engaging bracket 58 which is attached to the frame 10 by the rivet 62 which also provides the means for mounting the entire brush assembly 48 to the frame 10. When the bracket 57 is secured to the frame by rivets 62 with the brushes 38 and 40 engaging the commutator, the pivot pin 54 will extend generally parallel to the axis of rotation of the shaft 14, and the brush carrying arms 50 and 52 will be disposed between the flat portion 56 of the bracket and end plate 96 closing the end of frame 10. The end plate 96 provides a pad 98 near its periphery that is adapted to engage a tongue 100 of the brush supporting arm 52 which prevents the brush arms from disengagement of the pivot pin 54 when the end plate is fastened in place. That provides a limited amount of movement axially of the shaft but prevents disengagement of the parts.

While the embodiment of the present invention as herein disclosed, constitutes a preferred form, it is to be understood that other forms might be adopted.

What is claimed is as follows:

1. An electric motor brush rigging for holding a pair of brushes against the commutator of the motor comprising, a tubular frame: a bracket attached to the frame, said bracket including a lug cut out from the bracket and bent radially inward therefrom; a pivot member attached to the bracket; a pair of brush holders mounted on said pivot member with the holders extending in opposite directions from the pivot member, each holder carrying a brush for engagement with the commutator and a U-shaped leaf spring having a re-entrantly curved mid-portion between the extending arm portions seated on said lug and disposed between the lug and the pivot member for forcing the brushes against the commutator.

2. A brush rigging for mounting a pair of brushes of an electric motor in cooperative relationship with the commutator of the motor comprising; a tubular frame; a bracket having an arcuate portion adapted to be mounted on the inner surface of the frame and having a radially extending inward lug centrally positioned between the ends of the arcuate portion, a pivot member attached to the bracket, said pivot member extending parallel with the axis of the commutator, a pair of brush holders mounted at one end on the pivot members with the other end of said holders extending substantially in opposite directions from the pivot member, each holder carrying a brush for engagement with the commutator, a U-shaped leaf spring disposed between the lug and the pivot, said spring having its yoke provided with a transverse recess to receive the lug for positioning said spring, and having arms engaging the holders, said arms being tensioned so as to transmit spring pressure to the holders.

3. In a brush rigging for an electric machine comprising a commutator and a pair of brushes engaging the commutator, the combination comprising, a tubular frame; an L-shaped bracket having one of its arms engaging the internal surface of the frame; means for securing the said one arm to the frame; a lug cut from the said one arm and bent inwardly; a pivot pin carried by the other arm of the bracket; a pair of levers independently pivoted on the pin, said levers extending in opposite directions from the pivot pin; a brush carried by each lever; and a U-shaped leaf spring having its yoke deformed transversely to receive the lug and having one of its ends bearing upon one arm and the other end upon the other arm, whereby a substantially equal pressure will be applied to each arm for pressing the brushes against the commutator.

4. In a dynamoelectric machine having a magnetic frame with a cylindrical portion surrounding a rotatable portion concentric therewith, the combination comprising; a brush assembly cooperating with the commutator and including, a brush supporting bracket having a mounting portion of arcuate form to be secured on the inside surface of said cylindrical frame portion, said brush supporting bracket having a plane portion extending radially toward the axis of the commutator, and providing a pivot pin parallel with the axis of rotation, said mounting portion of the bracket having a web extending inward toward the pivot pin, a pair of brush holders each pivoted at one end about the pivot pin and having the free ends extending substantially in opposed directions toward the commutator, a bow spring of sheet metal seated on and positioned by the web of the bracket with end portions engaging the free ends of both brush holders so that both brushes of each assembly are urged to engage the commutator.

5. The combination set forth in claim 4 wherein one of the brush holders on the assembly comprises a nonconducting member, and the other brush holder comprises a sheet metal member having portions at the pivoted end that straddle the pivoted end of the nonconducting brush holder.

6. In a dynamoelectric machine having a magnetic frame provided with field windings, and an end plate rotatably supporting a commutator; the combination comprising; a cylindrical end portion on the field frame concentric with said armature, a brush assembly mounted on the inside of the cylindrical portion and comprising a bracket having an arcuate flange for mounting on the inner surface of said cylindrical portion and a flat portion extending inwardly and radially thereof, a pivot pin carried by the flat portion and extending parallel with the axis of the commutator, brush supporting arms pivotally carried by the pivot pin, a leaf spring having a mid-portion reacting against said bracket and spaced arms urging the brush carrying arms toward the commutator and means on the end plate for holding the brush supporting arms on the pivot pin.

7. The combination set forth in claim 6 where the arcuate portion of said bracket has an inwardly radially extending web providing a seat for said leaf spring, and a tang on the end of said web preventing displacement of said leaf spring, and terminal means for connecting the brush assembly with the windings of said field frame.

8. A brush assembly for use in a dynamoelectric machine having a cylindrical frame portion concentric with an armature rotatable relative to an end plate closing the cylindrical end portion, the combination comprising; a sheet metal bracket having a curved mounting portion contoured to fit the cylindrical end portion of the frame, and having a flat plate portion extending at right angles thereto, a pivot pin secured on the flat portion of said bracket, a rib of the bracket extending from the curved portion toward the pivot pin, a nonconducting brush supporting arm pivoted at one end upon said pivot pin and its free end extending over said armature, a formed sheet metal brush carrying arm also pivoted upon said pin and having its free end extending over said armature, and a U-shaped leaf spring seated on said inwardly directed rib and having its end portions disposed over the free ends of said brush carrying arms to maintain brushes carried thereby in engagement with the rotating commutator.

9. A brush assembly for mounting on a cylindrical surface concentric with the axis of a commutator rotatable in an end plate, the combination comprising, a sheet metal bracket having a curved base portion concentric with said cylindrical surface, a plane portion integrally joined to the base portion and extending radially inward relative thereto, a pivot pin secured to the plane portion and extending parallel with the axis of said commutator, said base portion having a transverse rib extending radially therefrom toward the pivot pin, a pair of brush carrying arms pivotally mounted at one end on said pivot pin and having their free ends diverging therefrom extending over said commutator, a brush mounted on the free end of each arm and adapted to rub on said commutator, a bowed leaf spring seated on and held by said rib and engaging the free ends of said brush carrying arms to urge said brushes into engagement with said commutator, and means preventing displacement of said spring from said rib.

10. The combination set forth in claim 9 wherein the brush carrying arms include a nonconducting member pivotally supporting one brush, and a formed sheet metal member with apertured ears extending on each side of said nonconducting member, and both of said arms formed at their free ends to support their respective brushes in right angle engagement with said commutator.

11. A brush assembly for mounting on a cylindrical surface, the combination comprising; a sheet metal bracket having a curved base portion concentric with said cylindrical surface, a plane portion integrally joined to the base portion and extending from the concave side of said base portion, a pivot pin secured at one end to the plate portion and extending parallel with the axis of said curved base, said base portion having a transverse rib extending from the concave side toward the pivot pin, a pair of brush carrying arms pivotally mounted at one end on said pivot pin and having their free ends extending substantially in opposite directions, a brush mounted on the free end of each arm, a bowed leaf spring seated on and held by said rib and engaging the free ends of said brush carrying arms, and means for preventing the displacement of said spring from said rib.

12. The combination set forth in claim 9 wherein the means preventing displacement of said spring includes a reentrant bend in the bight of said leaf spring to seat against said rib and a radially extending lug at one of said transverse ribs.

References Cited in the file of this patent

UNITED STATES PATENTS

| | | |
|---|---|---|
| 1,192,268 | Borchard | July 25, 1916 |
| 1,756,692 | Leland | Apr. 29, 1930 |
| 2,568,480 | Barkis | Sept. 18, 1951 |

FOREIGN PATENTS

| | | |
|---|---|---|
| 148,250 | Switzerland | Sept. 16, 1931 |